(12) United States Patent
Hattori et al.

(10) Patent No.: US 8,877,099 B2
(45) Date of Patent: Nov. 4, 2014

(54) TI$_3$SIC$_2$ BASED MATERIAL, ELECTRODE, SPARK PLUG AND MANUFACTURING METHOD THEREOF

(75) Inventors: Tetsuya Hattori, Konan (JP); Takafumi Kimata, Gamagori (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 35 days.

(21) Appl. No.: 13/358,887

(22) Filed: Jan. 26, 2012

(65) Prior Publication Data

US 2012/0186723 A1 Jul. 26, 2012

Related U.S. Application Data

(60) Provisional application No. 61/436,262, filed on Jan. 26, 2011.

(51) Int. Cl.
| | |
|---|---|
| *H01B 1/04* | (2006.01) |
| *C04B 37/00* | (2006.01) |
| *H01T 13/39* | (2006.01) |
| *C04B 35/56* | (2006.01) |
| *C04B 37/02* | (2006.01) |
| *H01T 21/02* | (2006.01) |
| *C04B 35/645* | (2006.01) |

(52) U.S. Cl.
CPC ........... *H01T 13/39* (2013.01); *C04B 2235/404* (2013.01); *C04B 2235/3817* (2013.01); *C04B 37/001* (2013.01); *C04B 2235/658* (2013.01); *C04B 2237/36* (2013.01); *C04B 2237/405* (2013.01); *C04B 2235/80* (2013.01); *C04B 35/5615* (2013.01); *C04B 2235/3891* (2013.01); *C04B 2235/77* (2013.01); *C04B 2235/402* (2013.01); *C04B 2235/428* (2013.01); *C04B 35/5618* (2013.01); *C04B 37/021* (2013.01); *H01T 21/02* (2013.01); *C04B 2237/343* (2013.01); *C04B 35/645* (2013.01); *C04B 2235/661* (2013.01); *C04B 2235/48* (2013.01); *C04B 2235/9607* (2013.01); *C04B 2235/3843* (2013.01)

USPC .......................................... 252/516; 219/553

(58) Field of Classification Search
CPC ........... H01B 1/04; H01M 4/58; H05B 3/148; H01T 13/39; H01L 29/1608; C04B 41/5057; C04B 35/5615; C04B 35/5618; C04B 2235/77; C01B 31/305
USPC .......................................... 252/516; 219/553
See application file for complete search history.

(56) References Cited

U.S. PATENT DOCUMENTS 5,882,561 A * 3/1999 Barsoum et al. ................. 501/88
5,942,455 A * 8/1999 Barsoum et al. ................. 501/91
(Continued)

FOREIGN PATENT DOCUMENTS

| JP | 2002-235139 A1 | 8/2002 |
|---|---|---|
| JP | 2003-020279 A1 | 1/2003 |

(Continued)

OTHER PUBLICATIONS

Barsoum et al "Synthesis and characterization of a remarkable ceramic: Ti3SiC2", J. Am. Ceram. Soc. 79(7) 1953-56 1996.*

(Continued)

*Primary Examiner* — Mark Kopec
(74) *Attorney, Agent, or Firm* — Burr & Brown, PLLC

(57) ABSTRACT

The present invention provides a Ti$_3$SiC$_2$ based material that exhibits excellent arc resistance, an electrode, a spark plug, and methods of manufacturing the same. A Ti$_3$SiC$_2$ based material according to the present invention includes Ti$_3$SiC$_2$ as a main phase, the Ti$_3$SiC$_2$ based material having a TiC content of 0.5 mass % or less and an open porosity of 0.5% or less. It may be preferable that 0 to 30 mol % of Si in the main phase Ti$_3$SiC$_2$ be substituted with Al. A spark plug according to the present invention includes an electrode formed using the Ti$_3$SiC$_2$ based material.

11 Claims, 1 Drawing Sheet

(56) References Cited

U.S. PATENT DOCUMENTS

| | | | | |
|---|---|---|---|---|
| 6,461,989 | B1* | 10/2002 | El-Raghy et al. | 501/87 |
| 6,903,313 | B2* | 6/2005 | Sundberg et al. | 219/553 |
| 2010/0052498 | A1 | 3/2010 | Walker, Jr. | |

FOREIGN PATENT DOCUMENTS

| | | |
|---|---|---|
| JP | 2004-107152 A1 | 4/2004 |
| JP | 3562532 B2 | 9/2004 |
| JP | 2005-089252 A1 | 4/2005 |
| JP | 3951643 B2 | 8/2007 |
| JP | 4362582 B2 | 11/2009 |
| JP | 2011-088804 A1 | 5/2011 |

OTHER PUBLICATIONS

Yang et al "effect of Al addition on the synthesis of Ti3SiC2 bulk material . . . ", Journal of the Suropean Society 27 (2007) 4807-4812.*

Zhang et al "Rapid synthesis of ternary carbide Ti3SiC2 through pulse discharge sintering . . . ", Metallurgical and Materials Trans A 33A (Nov. 2002) 3321-28.*

Nguyen et al "Cyclic-oxidation behavior of Ti3Al0.7Si0.3C2 compounds between 900 and 1100° C. in air", Oxid Met (2009) 72:299-309.*

Wu et al "Neutron diffraction studies of Ti3Si0.9Al0.1C2 compound", Materials Lett 59 (2005) 2715-2719.*

Zhou et al "In-situ hot pressing/solid liquid reaction synthesis of dense titanium silicon carbide bulk ceramics", Mat Res Innovat (1998) 2; 142-146.*

Zhou et al "Preparation of TiC free Ti3SiC2 with improved oxidation resistance by substitution of Si with Al", Mat Res Innovat (2004) 8.2: 97-102.*

Wan et al "In situ reaction synthesis and characterization of Ti3Si(Al)C2/SiC composites", Ceramics International 32 (2006) 883-890.*

B.Y. Liang, "*Effect of Alloying Time on Fabrication of $Ti_3Si(Al)C_2$ by Spark Plasma Sintering*," Advances in Applied Ceramics, Apr. 1, 2009, vol. 108, No. 3, pp. 162-166.

International Search Report and Written Opinion dated Feb. 28, 2012.

* cited by examiner

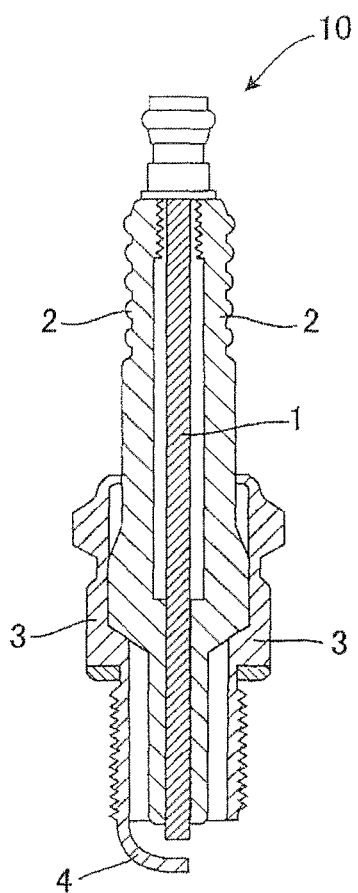

TI₃SIC₂ BASED MATERIAL, ELECTRODE, SPARK PLUG AND MANUFACTURING METHOD THEREOF

FIELD OF THE INVENTION

The present invention relates to a $Ti_3SiC_2$ based material that exhibits excellent spark wear resistance and excellent oxidation resistance, an electrode, a spark plug, and methods of manufacturing the same.

BACKGROUND OF THE INVENTION

A Ni alloy, a Pt alloy, or an Ir alloy has been used as a spark plug electrode material (see Patent Document 1). A Ni alloy is inexpensive, but exhibits poor spark wear resistance. Therefore, a spark plug made of a Ni alloy must be frequently replaced. A Pt alloy and an Ir alloy, which are noble metal alloy, provide a spark plug with a long lifetime due to excellent oxidation resistance and excellent spark wear resistance, but are expensive. An electrode obtained by welding a chip made of a Pt alloy or an Ir alloy to the tip end of a Ni alloy electrode (i.e., only the tip end of the electrode is formed of a Pt alloy or an Ir alloy) has been proposed in order to reduce cost. However, peeling the chip off or the like may occur due to a difference in coefficient of linear expansion (see Patent Document 2). Thus, a spark plug electrode material that is inexpensive and has a sufficient lifetime has not been proposed.

In recent years, a spark plug electrode has been exposed to a severe environment along with an improvement in engine fuel efficiency, a high performance, and the like. Therefore, an electrode material that exhibits more excellent resistance (e.g., oxidation resistance and spark wear resistance) has been increasingly desired. $Ti_3SiC_2$ that exhibits excellent spark wear resistance, oxidation resistance, and heat resistance, and is cheaper than an alloy material has been proposed as an alternative to an alloy material (see Patent Document 3).

$Ti_3SiC_2$ exhibits high thermal conductivity, electrical conductivity, thermal shock resistance, and workability (properties of a metal) and excellent heat resistance and oxidation resistance (properties of a ceramic), and is considered to be a promising spark plug electrode material. However, since it is difficult to synthesize single-phase $Ti_3SiC_2$, TiC and SiC may be present in the resulting $Ti_3SiC_2$ as heterophases. Moreover, since it is difficult to sufficiently densify $Ti_3SiC_2$ under normal pressure, the resulting $Ti_3SiC_2$ may have an open porosity of several percents (see Patent Documents 4 to 6).

RELATED-ART DOCUMENT

Patent Document

Patent Document 1 JP-A-2002-235139
Patent Document 2 Japanese Patent No. 3562532
Patent Document 3 US2010/0052498A1
Patent Document 4 Japanese Patent No. 4362582
Patent Document 5 Japanese Patent No. 3951643
Patent Document 6 JP-A-2005-89252

SUMMARY OF THE INVENTION $Ti_3SiC_2$ exhibits excellent spark wear resistance, oxidation resistance, and heat resistance, but does not necessarily exhibit sufficient arc resistance (spark wear resistance and oxidation resistance) for use as an electrode material (particularly a spark plug electrode material).

An object of the present invention is to provide a $Ti_3SiC_2$ based material that exhibits excellent arc resistance, an electrode, a spark plug, and methods of manufacturing the same.

In order to solve above object, the inventors of the present invention found a dense $Ti_3SiC_2$ sintered body in which almost no TiC phase remains. When a TiC phase and pores are present, the TiC phase and the pores predominately cause oxidation or spark wear, so that the lifetime of the electrode material shortens. Therefore, a dense $Ti_3SiC_2$ sintered body in which almost no TiC phase remains is required for use as an electrode material (particularly a spark plug electrode material). According to the present invention, there are provided the following $Ti_3SiC_2$ based material, electrode, spark plug, and methods of manufacturing the same.

[1] A $Ti_3SiC_2$ based material comprising $Ti_3SiC_2$ as a main phase, the $Ti_3SiC_2$ based material having a TiC content of 0.5 mass % or less and an open porosity of 0.5% or less.

[2] The $Ti_3SiC_2$ based material according to [1], wherein 0 to 30 mol % of Si in the main phase $Ti_3SiC_2$ is substituted with Al.

[3] The $Ti_3SiC_2$ based material according to [1], the $Ti_3SiC_2$ based material having a $Ti_5Si_3$ content of 8 mass % or less.

[4] The $Ti_3SiC_2$ based material according to [1], the $Ti_3SiC_2$ based material having a SiC content of 5 mass % or less.

[5] The $Ti_3SiC_2$ based material according to [1], the $Ti_3SiC_2$ based material having a $TiSi_2$ content of 3 mass % or less.

[6] The $Ti_3SiC_2$ based material according to [1], the $Ti_3SiC_2$ based material having a thermal conductivity of 25 W/mK or more.

[7] The $Ti_3SiC_2$ based material according to [1], the $Ti_3SiC_2$ based material having a bending strength of 200 MPa or more.

[8] The $Ti_3SiC_2$ based material according to [1], the $Ti_3SiC_2$ based material having a coefficient of thermal expansion of 7 to 9 ppm/K.

[9] The $Ti_3SiC_2$ based material according to [1], the $Ti_3SiC_2$ based material having a volume resistivity of $1 \times 10^{-4}$ Ω·cm or less.

[10] The $Ti_3SiC_2$ based material according to [1], wherein an oxide film formed when allowing the $Ti_3SiC_2$ based material to stand at 1000° C. for 5 hours under atmospheric pressure has a thickness of 40 μm or less.

[11] An electrode formed by using the $Ti_3SiC_2$ based material according to [1].

[12] A spark plug formed by using the electrode according to [11].

[13] A method of manufacturing a $Ti_3SiC_2$ based material comprising mixing 68.0 to 73.5 mass % of a titanium source, 14.0 to 19.0 mass % of a silicon source, and 11.0 to 14.0 mass % of a carbon source, subjecting thus obtained raw material powder mixture to forming, and firing the resultant formed body.

[14] The method of manufacturing a $Ti_3SiC_2$ based material according to [13], comprising performing a first firing at 600 to 1400° C. for 0.5 to 20 hours under vacuum or an Ar atmosphere after subjecting the obtained raw material powder mixture to forming, and then performing a second firing for 0.5 to 20 hours at a temperature within a range of 1000 to 1750° C. that is higher than a temperature of the first firing.

[15] The method of manufacturing a $Ti_3SiC_2$ based material according to [13], wherein the first firing and the second firing are performed by hot pressing at a pressure of 50 to 450 kg/cm².

[16] A method of manufacturing a $Ti_3SiC_2$ based material comprising mixing 68.0 to 73.5 mass % of a titanium source, 9.0 to 19.0 mass % of a silicon source, 0 to 5.0 mass % of an aluminum source, and 11.0 to 14.0 mass % of a carbon source, subjecting thus obtained raw material powder mixture to forming, and firing the resultant formed body.

[17] The method of manufacturing a $Ti_3SiC_2$ based material according to [16], comprising performing a first firing at 600 to 1400° C. for 0.5 to 20 hours under vacuum or an Ar atmosphere after subjecting the obtained raw material powder mixture to forming, and then performing a second firing for 0.5 to 20 hours at a temperature within a range of 1000 to 1750° C. that is higher than a temperature of the first firing.

[18] The method of manufacturing a $Ti_3SiC_2$ based material according to [16], wherein the first firing and the second firing are performed by hot pressing at a pressure of 50 to 450 $kg/cm^2$.

[19] A method of manufacturing a spark plug comprising embedding the electrode according to [11] in an insulator formed body, and firing the electrode and the insulator formed body to convert the insulator formed body into an insulator and simultaneously to bond the insulator to the electrode.

The $Ti_3SiC_2$ based material according to the present invention exhibits improved arc resistance (spark wear resistance and oxidation resistance) as a result of significantly reducing the TIC (heterophase) content and the open porosity. The arc resistance of the $Ti_3SiC_2$ based material is further improved by solid solution of Al. An inexpensive spark plug electrode material that exhibits significantly improved arc resistance can thus be provided.

BRIEF DESCRIPTION OF THE DRAWINGS

FIG. 1 is a schematic cross-sectional view showing a spark plug.

DETAILED DESCRIPTION OF THE INVENTION

Exemplary embodiments of the present invention are described below with reference to the drawing. Note that the present invention is not limited to the following exemplary embodiments. Various modifications and improvements may be made to the following exemplary embodiments without departing from the scope of the present invention.

A $Ti_3SiC_2$ based material according to the present invention includes $Ti_3SiC_2$ as a main phase, and the material has a TiC content of 0.5 mass % or less and an open porosity of 0.5% or less. Note that the term "main phase" used herein refers to a phase that accounts for 60 mass % or more of a material.

$Ti_3SiC_2$ exhibits excellent spark wear resistance, oxidation resistance, and heat resistance. When a TiC phase and pores are present, however, the TiC phase and the pores predominately cause oxidation or spark wear, so that the lifetime as the electrode material shortens. The $Ti_3SiC_2$ based material according to the present invention is a dense $Ti_3SiC_2$ sintered body in which almost no TiC phase remains.

A $Ti_3SiC_2$ based material having a TiC content of 0.5 mass % or less and an open porosity of 0.5% or less may be synthesized by mixing a titanium source, a silicon source, an aluminum source, and a carbon source in a given mixing ratio (described later), and firing the resultant mixture at a given firing temperature. The $Ti_3SiC_2$ based material may be used as an electrode material (particularly a spark plug electrode material). The present material is good in the arc resistance (spark wear resistance and oxidation resistance).

In the $Ti_3SiC_2$ based material according to the present invention, it is preferable that 0 to 30 mol % of Si in the main phase $Ti_3SiC_2$ is substituted with Al. That is, it may preferably be $Ti_3Si_{(1-x)}Al_xC_2$ (x=0 to 0.3). It is preferable that 0 to 20 mol %, and more preferably 0 to 10 mol %, of Si in the main phase $Ti_3SiC_2$ is substituted with Al. The arc resistance of the $Ti_3SiC_2$ based material is improved by substituting Si in $Ti_3SiC_2$ with Al.

It is preferable that the $Ti_3SiC_2$ based material according to the present invention has a $Ti_5Si_3$ content of 8 mass % or less. It is more preferable that the $Ti_3SiC_2$ based material has a $Ti_5Si_3$ content of 7 mass % or less, and more preferably 6 mass % or less. If the $Ti_3SiC_2$ based material has a $Ti_5Si_3$ content of 8 mass % or less, the $Ti_3SiC_2$ based material exhibits improved arc resistance.

It is preferable that the $Ti_3SiC_2$ based material according to the present invention has a SiC content of 5 mass % or less. It is more preferable that the $Ti_3SiC_2$ based material has a SiC content of 4.5 mass % or less, and more preferably 4 mass % or less. If the $Ti_3SiC_2$ based material has a SiC content of 5 mass % or less, the $Ti_3SiC_2$ based material exhibits improved arc resistance.

It is preferable that the $Ti_3SiC_2$ based material according to the present invention has a $TiSi_2$ content of 3 mass % or less. It is more preferable that the $Ti_3SiC_2$ based material has a $TiSi_2$ content of 0 mass %. If the $Ti_3SiC_2$ based material has a $TiSi_2$ content of 3 mass % or less, the $Ti_3SiC$, based material exhibits improved arc resistance.

It is preferable that the $Ti_3SiC_2$ based material according to the present invention has a thermal conductivity of 25 W/mK or more. It is more preferable that the $Ti_3SiC_2$ based material has a thermal conductivity of 30 W/mK or more. If the $Ti_3SiC_2$ based material has a thermal conductivity of 25 W/mK or more, the $Ti_3SiC_2$ based material exhibits a favorable heat dissipation capability as against an increase in temperature due to ignition of fuel when using the $Ti_3SiC_2$ based material as a material for a spark plug, so that oxidation consumption can be suppressed.

It is preferable that the $Ti_3SiC_2$ based material according to the present invention has a bending strength of 200 MPa or more. It is more preferable that the $Ti_3SiC_2$ based material has a bending strength of 250 MPa or more, and more preferably 270 MPa or more. If the $Ti_3SiC_2$ based material has a bending strength of 200 MPa or more, the $Ti_3SiC_2$ based material may be used as a material for forming a member for which strength is required.

It is preferable that the $Ti_3SiC_2$ based material according to the present invention has a coefficient of thermal expansion of 7 to 9 ppm/K. It is more preferable that the $Ti_3SiC_2$ based material has a coefficient of thermal expansion of 8 to 9 ppm/K. If the $Ti_3SiC_2$ based material has a coefficient of thermal expansion of 7 to 9 ppm/K, the $Ti_3SiC_2$ based material may be used as a material for forming a member that is used at a high temperature.

It is preferable that the $Ti_3SiC_2$ based material according to the present invention has a volume resistivity of $1 \times 10^{-4}$ Ω·cm or less. It is more preferable that the $Ti_3SiC_2$ based material has a volume resistivity of $5 \times 10^{-5}$ Ω·cm or less, and more preferably $3 \times 10^{-5}$ Ω·cm or less. If the $Ti_3SiC_2$ based material has a volume resistivity of $1 \times 10^{-4}$ Ω·cm or less, the $Ti_3SiC_2$ based material may suitably be used as a material for forming a spark plug owing to reduced energy loss.

It is preferable that an oxide film formed when allowing the $Ti_3SiC_2$ based material according to the present invention to stand at 1000° C. for 5 hours under atmospheric pressure has a thickness of 40 μm or less. It is more preferable that the oxide film has a thickness of 35 μm or less, and more preferably 30 μm or less. If the oxide film has a thickness of 40 μm or less, the $Ti_3SiC_2$ based material may be used as a conductive material that is used at a high temperature owing to being hardly oxidized.

The $Ti_3SiC_2$ based material according to the present invention may be used as an electrode material. More specifically, a spark plug electrode may be formed by using the $Ti_3SiC_2$ based material. FIG. 1 shows a spark plug 10 according to the present invention. The spark plug 10 is used for ignition in a combustion apparatus such as an engine, and includes a center electrode 1, a ground electrode 4, and the like. The center electrode 1 and the ground electrode 4 may be formed by using the $Ti_3SiC_2$ based material. Accordingly the present invention also relates to an electrode formed by using the $Ti_3SiC_2$ based material, and the spark plug 10 formed by using the electrode.

As shown in FIG. 1, the spark plug 10 includes the center electrode 1, an insulator 2 that is disposed to surround the center electrode 1, a tubular metal shell (housing) 3 that holds the insulator, and the ground electrode 4 that is bonded to the metal shell 3. The center electrode 1 and the ground electrode 4 are disposed opposite to each other so that a spark discharge gap is formed.

The insulator 2 has an axial hole passing through the insulator 2 in the axial direction, and holds the center electrode 1 within the axial hole. The metal shell 3 radially surrounds the insulator 2 to hold the insulator 2. The metal shell 3 secures the spark plug 10 on an internal combustion engine. The ground electrode 4 is bonded to the metal shell 3 at one end, and faces the tip end of the center electrode 1 at another end.

A method of manufacturing the $Ti_3SiC_2$ based material according to the present invention is described below. $Ti_3(Si,Al)C_2$ having a low TiC content may be obtained by mixing a titanium source, a silicon source, an aluminum source, and a carbon source in a given mixing ratio (described later), and firing the resultant mixture at a given firing temperature. In order to obtain a material closer to single-phase, the supplied amounts of the silicon source, the aluminum source, and the carbon source, which are easily deviated from the supplied composition, may be adjusted. When mixing the titanium source, the silicon source, the aluminum source, and the carbon source for a short time (several to several tens of minutes) using a mortar or the like, it is preferable to adjust the amount of the silicon source (up to about 1.2-fold molar excess with respect to the desired composition). When mixing the titanium source, the silicon source, the aluminum source, and the carbon source for a long time (several hours) using a pot mill or the like, the raw materials tend to be oxidized. In this case, it is preferable to adjust the amount of the carbon source (up to about 1.1-fold molar excess with respect to the desired composition) in addition to the amount of the silicon source. Metallic aluminum may turn into vapor to vaporize during synthesis due to its low melting point, so that it easily causes deviation from the desired composition. Therefore, dense $Ti_3(Si,Al)C_2$ substantially not deviating from the composition may be obtained by performing a firing schedule including temperature rising at the temperature range of 600 to 1400° C. over 0.5 to 20 hours to suppress vaporization of unreacted Al.

The method of manufacturing the $Ti_3SiC_2$ based material according to the present invention includes mixing 68.0 to 73.5 mass % of a titanium source, 14.0 to 19.0 mass % of a silicon source, and 11.0 to 14.0 mass % of a carbon source, subjecting thus obtained raw material powder mixture to forming, and firing the resultant formed body. Note that the term "mass ratio" used herein refers to the ratio of the elements (Ti Si, Al, and C) included in the raw materials. For example, when using a silicon carbide powder as the silicon source, the term "14.0 mass % of the silicon source" is referred to the mass ratio of Si contained in the silicon carbide powder to the total raw materials is 14.0 mass %. It is preferable to fire, in two stages that differ in firing temperature, the resultant formed body obtained by subjecting the obtained raw material powder mixture to forming. More specifically, it is preferable to perform a first firing at 600 to 1400° C. for 0.5 to 20 hours under vacuum or an Ar atmosphere, and then perform a second firing for 0.5 to 20 hours at a temperature within a range of 1000 to 1750° C. that is higher than that of the first firing. Note that the formed body subjected to the first firing is heated to the temperature employed for the second firing without cooling the formed body. The first firing and the second firing are more preferably performed for 0.5 to 10 hours, and still more preferably 0.5 to 5 hours.

A metallic titanium powder, $TiH_2$, or the like may be used as the titanium source. A metallic silicon powder or the like may be used as the silicon source. A carbon powder or the like may be used as the carbon source. A phenol resin that is pyrolyzed into carbon may also be used as the carbon source. A metallic aluminum powder may be used as the aluminum source. A compound formed by chemical bonding among each element, such as, for example, silicon carbide powder, may also be used. A metallic titanium powder, a silicon carbide powder, and a carbon powder being relatively inexpensive raw materials can be utilized as starting materials.

When mixing the raw materials, the silicon source may be used in up to about 1.2-fold molar excess with respect to the desired composition. The carbon source may be used in up to about 1.1-fold molar excess with respect to the desired composition. A $Ti_3SiC_2$ based material having a low heterophase content can be obtained by setting the mixing ratio of the raw materials, the firing temperature and the firing time employed for the first firing and the second firing, within the above ranges.

A method of manufacturing the $Ti_3SiC_2$ based material according to the present invention in which 0 to 30 mol % of Si in the main phase $Ti_3SiC_2$ is substituted with Al, includes mixing 68.0 to 73.5 mass % of a titanium source, 9.0 to 19.0 mass % of a silicon source, 0 to 5.0 mass % of an aluminum source, and 11.0 to 14.0 mass % of a carbon source, subjecting thus obtained raw material powder mixture to forming, and firing the resultant formed body. It is preferable to fire, in two stages that differ in firing temperature, the resultant formed body obtained by subjecting the obtained raw material powder mixture to forming. More specifically, it is preferable to perform a first firing at 600 to 1400° C. for 0.5 to 20 hours under vacuum or an Ar atmosphere, and then perform a second firing for 0.5 to 20 hours at a temperature within a range of 1000 to 1750° C. that is higher than that of the first firing. Note that the formed body subjected to the first firing is heated to the temperature employed for the second firing without cooling the formed body. The first firing and the second firing are more preferably performed for 0.5 to 10 hours, and still more preferably 0.5 to 5 hours.

In the case that a part of Si is substituted with Al, when mixing the raw materials, the silicon source may be used in up to about 1.2-fold molar excess with respect to the desired composition. The aluminum source may be used in up to about 1.1-fold molar excess with respect to the desired composition. The carbon source may be used in up to about 1.1-fold molar excess with respect to the desired composition. A $Ti_3SiC_2$ based material having a low heterophase content can be obtained by setting the mixing ratio of the raw materials, the firing temperature and the firing time employed for the first firing and the second firing within the above ranges.

The first firing and the second firing may be performed by hot pressing regardless of whether or not Si in the main phase $Ti_3SiC_2$ is substituted with Al. Hot pressing is preferably performed at a pressure of 50 to 450 kg/cm². Hot pressing is more preferably performed at a pressure of 100 to 350 kg/cm², and still more preferably 200 to 250 kg/cm². It can suppress deviation of composition to manufacture a $Ti_3SiC_2$ based material having a low heterophase content by performing the first firing and the second firing while setting the pressing pressure within the above range.

A method of manufacturing the spark plug 10 is described below. The center electrode 1 and the ground electrode 4 of the spark plug 10 may be formed by cutting (machining) the $Ti_3SiC_2$ based material according to the present invention.

The insulator 2 is obtained as described below. For example, a raw material powder including alumina, a binder, and the like is press-formed to obtain a tubular formed body. The formed body is ground to obtain an insulator formed body. The electrode (center electrode 1) is embedded in the insulator formed body, and the electrode and the insulator formed body are fired to convert the insulator formed body into the insulator 2 and simultaneously to bond the insulator 2 to the electrode. Since the firing of the insulator formed body and the bonding of electrode and the insulator can be performed in one process, the production cost can be reduced.

The metal shell 3 is formed by using a tubular metal material, and the ground electrode 4 is bonded to the metal shell 3. Thereafter, the spark plug 10 may be obtained by securing the insulator 2 including the center electrode 1 and the like on the metal shell 3 including the ground electrode 4.

EXAMPLES

The present invention is further described below by way of examples. Note that the present invention is not limited to the following examples.

Mixing

Examples 1 and 3 to 12 and Comparative Examples 1 to 4

A metallic titanium powder was used as a titanium source. A silicon carbide powder was used as a silicon source. The silicon carbide powder and a carbon powder (the amount deficient by the silicon carbide powder) were used as a carbon source. A metallic aluminum powder was used as an aluminum source. The raw materials were mixed in the mixing ratio (mass %) shown in Table 1. The ratio of each element contained in the raw material mixture is shown in Table 1 (see "Element ratio"). The raw materials were mixed for 10 minutes by using a pestle and a mortar. About 20 g of the mixed powder was weighed, and press-formed to a diameter of 35 mm and a thickness of 10 mm.

Example 2

The same raw materials as those used in Example 1 were mixed in the mixing ratio (mass %) shown in Table 1. The raw materials were mixed as described below. Specifically, nylon cobblestones (with an iron core) were put in a pot mill, and the raw materials were mixed for 4 hours in the pot mill by using IPA as a solvent. The mixed powder was dried by using an evaporator, and sieved (#30 mesh). About 20 g of the mixed powder was weighed, and press-formed to a diameter of 35 mm and a thickness of 10 mm.

Firing

Examples 1 to 8 and Comparative Examples 1 to 3

The formed body obtained by press forming was hot-pressed at 1600° C. and 210 kg/cm² for 4 hours under an Ar atmosphere to obtain a sintered body (sample).

Examples 9, 10 and 12 and Comparative Example 4

The formed body obtained by press forming was hot-pressed at 1000° C. and 210 kg/cm² for 4 hours under an Ar atmosphere, and then hot-pressed at 1600° C. for 4 hours to obtain a sintered body (sample).

Example 11

The formed body obtained by press forming was hot-pressed at 1000° C. and 210 kg/cm² for 4 hours under an Ar atmosphere, and then hot-pressed at 1675° C. for 4 hours to obtain a sintered body (sample).

Comparative Example 5

A commercially available spark plug center electrode made of Ni alloy was used.

Crystal Phase

The X-ray diffraction pattern of the sintered body (sample) was measured by a θ-2θ method. The X-ray diffraction pattern was measured using an X-ray diffractometer (manufactured by Rigaku Corporation) (X-ray source: Cu-Kα). The amount (mass %) of each crystal phase was calculated from the intensity ratio of the main peak attributed to $Ti_3SiC_2$ and the other peak attributed to each crystal phase other than $Ti_3SiC_2$ in the X-ray diffraction pattern.

Open Porosity

The open porosity of the sintered body (sample) was calculated by the Archimedes method.

Bending Strength

The bending strength of the sintered body (sample) was measured by performing a four-point bending test (JIS R 1601).

Thermal Conductivity

The thermal conductivity of the sintered body (sample) was calculated from the specific heat measured by differential scanning calorimetry (DSC), the thermal diffusion coefficient measured by a laser flash method, and the density measured by the Archimedes method (JIS R 1611).

Volume Resistivity

The volume resistivity of the sintered body (sample) was measured by a four-terminal method (JIS R 1650-2).

Thickness of Oxide Film

About 0.5 to 1.5 g (surface area: 1.6 to 3.2 cm²) of the sintered body (sample) was placed in a rectangular alumina box, and allowed to stand at 1000° C. for 5 hours under atmospheric pressure. The thickness of an oxide film formed by this operation was observed and measured by using a SEM.

Arc Wear Start Current Value and Arc Wear Rate

The processed sintered body (sample) (diameter: 0.6 mm, length: 15 to 20 mm) was used as an anode, and SUS 304 was used as a cathode. The anode (processed sintered body) was disposed at an angle of 45° relative to the cathode (SUS 304). The distance between the cathode and the anode was set to 5 mm. An arc discharge was generated at room temperature under atmospheric pressure by using a 100 kV power supply. The arc discharge was generated for 5 minutes (current value of power supply: 0.15 A), and the arc discharge area was observed by using an optical microscope to check the presence or absence of wear. When wear due to the arc discharge was not observed, an arc discharge was further generated for 5 minutes in a state in which the primary-side current value was increased by 0.05 A, and the arc discharge area was observed by using an optical microscope. This cycle (arc discharge and optical microscope observation) was repeated until wear began. As the primary-side current was changed, the current value at which wear was initially observed was taken as the arc wear start current value. An arc discharge was also generated for 5 minutes in a state in which the current value of the power supply was set to 0.45 A, and a reduced diameter by wearing from original shape was taken as the amount of wear. The arc wear rate was calculated by dividing the amount of wear by the discharge time.

Evaluation of Arc Resistance

A case where the arc wear rate was 20 μm/min or less was evaluated as "Very Good", a case where the arc wear rate was 21 to 30 μm/min was evaluated as "Good", and a case where the arc wear rate was 31 μm/min or more was evaluated as "Bad" (see Table 2).

TABLE 1

|  | Raw material mixing ratio (mass %) | | | | Element ratio (mass %) | | | | Amount of Si substituted with Al (mol %) |
|---|---|---|---|---|---|---|---|---|---|
|  | Ti | SiC | Al | C | Ti | Si | Al | C |  |
| Example 1 | 73.1 | 21.0 | 0.0 | 6.0 | 73.1 | 14.7 | 0.0 | 12.2 | 0 |
| Example 2 | 71.3 | 22.8 | 0.0 | 5.9 | 71.3 | 16.0 | 0.0 | 12.7 | 0 |
| Example 3 | 73.1 | 21.6 | 0.0 | 5.3 | 73.1 | 15.1 | 0.0 | 11.8 | 0 |
| Example 4 | 70.3 | 24.0 | 0.0 | 5.7 | 70.3 | 16.8 | 0.0 | 12.9 | 0 |
| Example 5 | 69.7 | 24.9 | 0.0 | 5.3 | 69.7 | 17.5 | 0.0 | 12.8 | 0 |
| Example 6 | 73.1 | 22.3 | 0.0 | 4.5 | 73.1 | 15.6 | 0.0 | 11.2 | 0 |
| Example 7 | 68.3 | 26.1 | 0.0 | 5.5 | 68.3 | 18.3 | 0.0 | 13.4 | 0 |
| Example 8 | 72.8 | 21.3 | 0.0 | 5.9 | 72.8 | 15.0 | 0.0 | 12.3 | 0 |
| Example 9 | 73.1 | 20.0 | 0.7 | 6.2 | 73.1 | 14.0 | 0.7 | 12.2 | 5 |
| Example 10 | 73.1 | 18.9 | 1.4 | 6.6 | 73.1 | 13.2 | 1.4 | 12.2 | 10 |
| Example 11 | 73.0 | 14.7 | 4.5 | 7.8 | 73.0 | 10.3 | 4.5 | 12.2 | 30 |
| Example 12 | 73.1 | 13.7 | 5.0 | 8.1 | 73.1 | 9.6 | 5.0 | 12.2 | 35 |
| Comparative Example 1 | 73.5 | 19.7 | 0.0 | 6.8 | 73.5 | 13.8 | 0.0 | 12.7 | 0 |
| Comparative Example 2 | 67.6 | 26.3 | 0.0 | 6.1 | 67.6 | 18.4 | 0.0 | 14.0 | 0 |
| Comparative Example 3 | 66.7 | 27.8 | 0.0 | 5.5 | 66.7 | 19.5 | 0.0 | 13.8 | 0 |
| Comparative Example 4 | 73.6 | 0.0 | 13.8 | 12.6 | 73.6 | 0.0 | 13.8 | 12.6 | 100 |
| Comparative Example 5 (Ni alloy) | — | — | — | — | — | — | — | — | — |

|  |  | Firing | | | |
|---|---|---|---|---|---|
|  |  | First firing | | Second firing | |
|  | Mixing method | Temperature (° C.) | Holding time (h) | Temperature (° C.) | Holding time (h) |
| Example 1 | Mortar | — | — | 1600 | 4 |
| Example 2 | Pot mill | — | — | 1600 | 4 |
| Example 3 | Mortar | — | — | 1600 | 4 |
| Example 4 | Mortar | — | — | 1600 | 4 |
| Example 5 | Mortar | — | — | 1600 | 4 |
| Example 6 | Mortar | — | — | 1600 | 4 |
| Example 7 | Mortar | — | — | 1600 | 4 |
| Example 8 | Mortar | — | — | 1600 | 4 |
| Example 9 | Mortar | 1000 | 4 | 1600 | 4 |
| Example 10 | Mortar | 1000 | 4 | 1600 | 4 |
| Example 11 | Mortar | 1000 | 4 | 1675 | 4 |
| Example 12 | Mortar | 1000 | 4 | 1600 | 4 |
| Comparative Example 1 | Mortar | — | — | 1600 | 4 |
| Comparative Example 2 | Mortar | — | — | 1600 | 4 |
| Comparative Example 3 | Mortar | — | — | 1600 | 4 |
| Comparative Example 4 | Mortar | 1000 | 4 | 1600 | 4 |
| Comparative Example 5 (Ni alloy) |  |  |  |  |  |

TABLE 2

| | Amount of crystal phase (mass %) | | | | | Material properties | | | | |
|---|---|---|---|---|---|---|---|---|---|---|
| | Ti$_3$(Si,Al)C$_2$ % | TiC % | Ti$_5$Si$_3$ % | SiC % | TiSi$_2$ % | Open porosity % | Strength MPa | Thermal conductivity W/mK | Resistivity 10$^{-5}$ Ωcm | Coefficient of thermal expansion ppm/K |
| Example 1 | 99.8 | 0.2 | 0 | 0 | 0 | 0.00 | 274 | 47 | 2.6 | 8.7 |
| Example 2 | 99.7 | 0.3 | 0 | 0 | 0 | 0.30 | 274 | 47 | 2.4 | 8.6 |
| Example 3 | 95.9 | 0.3 | 3.8 | 0 | 0 | 0.03 | 312 | 46 | 2.8 | |
| Example 4 | 96.0 | 0.2 | 0 | 3.8 | 0 | 0.00 | 290 | 47 | | |
| Example 5 | 93.2 | 0.3 | 2 | 4.5 | 0 | 0.04 | 312 | | 2.8 | |
| Example 6 | 91.3 | 0.4 | 8.3 | 0 | 0 | 0.00 | 349 | 45 | 2.6 | |
| Example 7 | 93.1 | 0.5 | 0 | 6.4 | 0 | 0.03 | | | 2.6 | |
| Example 8 | 96.4 | 0 | 0 | 0.4 | 3.2 | 0.27 | | | | |
| Example 9 | 95.2 | 0.3 | 4.5 | 0 | 0 | 0.04 | 353 | 25 | 2.4 | |
| Example 10 | 93.9 | 0.4 | 5.7 | 0 | 0 | 0.02 | 347 | 40 | 2.8 | |
| Example 11 | 91.9 | 0.5 | 7.6 | 0 | 0 | 0.00 | 378 | 34 | 3.8 | |
| Example 12 | 92.8 | 0.4 | 6.8 | 0 | 0 | 0.00 | 360 | 48 | | |
| Comparative Example 1 | 96.0 | 4 | 0 | 0 | 0 | 0.6 | | 47 | 2.4 | |
| Comparative Example 2 | 87.2 | 5 | 0 | 7.8 | 0 | 0.8 | | 48 | | |
| Comparative Example 3 | 90.0 | 1.3 | 0 | 8.7 | 0 | 0.1 | | | | |
| Comparative Example 4 | 95.6 | 4.4 | 0 | 0 | 0 | 0.02 | 300 | 38 | 3.8 | |
| Comparative Example 5 (Ni alloy) | — | — | — | — | — | — | — | — | — | About 13 |

| | Arc resistance | | | | |
|---|---|---|---|---|---|
| | Oxidation resistance Thickness of oxide film μm | Arc wear start current value A | Arc wear rate μm/min | Evaluation | Bonding state to ceramic insulator |
| Example 1 | 5 | 0.35 | 14 | Very Good | Good |
| Example 2 | | 0.35 | 15 | Very Good | Good |
| Example 3 | 6 | 0.35 | 16 | Very Good | |
| Example 4 | 5 | 0.35 | 16 | Very Good | |
| Example 5 | | 0.35 | 18 | Very Good | |
| Example 6 | 8 | 0.30 | 25 | Good | |
| Example 7 | | 0.30 | 24 | Good | |
| Example 8 | | 0.25 | 28 | Good | |
| Example 9 | 22 | 0.35 | 14 | Very Good | |
| Example 10 | 30 | 0.35 | 12 | Very Good | Good |
| Example 11 | 33 | 0.35 | 18 | Very Good | |
| Example 12 | 40 | 0.30 | 30 | Good | |
| Comparative Example 1 | 7 | 0.25 | 39 | Bad | |
| Comparative Example 2 | | 0.25 | 38 | Bad | |
| Comparative Example 3 | | 0.25 | 35 | Bad | |
| Comparative Example 4 | 125 | 0.25 | 48 | Bad | |
| Comparative Example 5 (Ni alloy) | — | 0.25 | 50 | Bad | Bad |

The arc wear rates are compared below. The sintered bodies of Examples 1 to 12, in which the TiC content was 0.5 mass % or less and the open porosity was 0.5%, had a low arc wear rate, i.e., exhibited excellent arc resistance as compared with the sintered bodies of Comparative Examples 1 to 4. The wear state of the sintered body of Example 1 observed by using a SEM was compared with the wear state of the sintered body of Comparative Example 1 observed by using a SEM. In the sintered body of Comparative Example 1 in which the TiC content was large, TiC portion was oxidized and scattered. In the sintered body of Example 1 in which the TiC content was 0.5 mass % or less, an area in which TiC was scattered was rarely observed.

The sintered bodies of Example 1 to 5 and 9 to 11, in which 30 mol % or less of Si contained in Ti$_3$SiC$_2$ was substituted with Al, had a low arc wear rate, i.e., exhibited further excellent arc resistance as compared with the sintered body of Example 12.

The sintered bodies of Example 1 to 5, in which the Ti$_5$Si$_3$ content was 8 mass % or less, had a low arc wear rate, i.e., exhibited further excellent arc resistance as compared with the sintered body of Example 6. The sintered bodies of Example 1 to 5, in which the SiC content was 5 mass % or less, had a low arc wear rate, i.e., exhibited further excellent arc resistance as compared with the sintered body of Example 7. The sintered bodies of Example 1 to 5, in which the TiSi$_2$ content was 3 mass % or less, had a low arc wear rate, i.e., exhibited further excellent arc resistance as compared with the sintered body of Example 8.

The arc wear start current values are compared below. The sintered bodies of Example 1 to 5 and 9 to 11, in which 30 mol % or less of Si in $Ti_3SiC_2$ was substituted with Al, had a high arc wear start current value, i.e., exhibited excellent arc resistance as compared with the sintered body of Example 12. The sintered bodies of Example 1 to 5, in which the $Ti_5Si_3$ content was 8 mass % or less, had a high arc wear start current value, i.e., exhibited excellent arc resistance as compared with the sintered body of Example 6. The sintered bodies of Example 1 to 5, in which the SiC content was 5 mass % or less, had a high arc wear start current value, i.e., exhibited excellent arc resistance as compared with the sintered body of Example 7. The sintered bodies of Example 1 to 5, in which the $TiSi_2$ content was 3 mass % or less, had a high arc wear start current value, i.e., exhibited excellent arc resistance as compared with the sintered body of Example 8.

The sintered bodies of Example 1 to 12 that exhibited excellent arc resistance had a thermal conductivity of 25 W/mK or more, a bending strength of 200 MPa or more, a coefficient of thermal expansion of about 7 to 9 ppm/K, and a volume resistivity of $1\times10^{-4}$ Ω·cm or less.

When the sintered bodies of Examples 1, 3, 4, 6, and 9 to 11 were allowed to stand at 1000° C. for 5 hours under atmospheric pressure, peeling off of an oxide film from the base material was rarely observed. When the sintered body of Example 12 was allowed to stand at 1000° C. for 5 hours under atmospheric pressure, an oxide film having a thicker thickness was formed to reduce the oxidation resistance. The arc wear rate having a huge effect on thermal load was also low, i.e., excellent arc resistance was obtained when the Al content was 30 mol % or less.

Bonding State to Insulator

The main component (alumina) of an insulator and the dense $Ti_3SiC_2$ body were fired together to determine whether or not the dense $Ti_3SiC_2$ body could be bonded to alumina. The main component (alumina) of an insulator and the Ni alloy were fired together. A case where the material could be bonded to alumina was evaluated as "Good", and a case where the material could not be bonded to alumina was evaluated as "Bad" (see Table 2).

As shown in Table 2, the dense $Ti_3SiC_2$ body of Example 1 having a coefficient of thermal expansion relatively close to that (about 8 ppm/K) of the insulator could be bonded to the insulator by firing the dense $Ti_3SiC$, body together with the insulator. The dense $Ti_3SiC_2$ bodies of Examples 2 and 10 could also be bonded to the insulator. However, the Ni alloy used in Comparative Example 5 could not be bonded to the insulator. Therefore, it is expected that the spark plug production process can be simplified, i.e., the production cost can be reduced by utilizing the dense $Ti_3SiC_2$ body of Example 1, 2, or 10 that can be bonded to the insulator by firing together.

As described above, the $Ti_3SiC_2$ based material according to the present invention exhibited improved arc resistance as a result of significantly reducing the TiC (heterophase) content and the open porosity. An inexpensive spark plug electrode material that has a long lifetime and exhibits significantly improved arc resistance can thus be provided.

INDUSTRIAL APPLICABILITY

The $Ti_3SiC_2$ based material according to the present invention may be used as an electrode material (particularly a spark plug electrode material). An electrode and a spark plug formed by using the $Ti_3SiC_2$ based material according to the present invention are inexpensive, and exhibit excellent arc resistance.

LIST OF REFERENCE SYMBOLS

1: center electrode, 2: insulator, 3: metal shell, 4: ground electrode, 10: spark plug

The invention claimed is:

1. A $Ti_3SiC_2$ based material comprising $Ti_3SiC_2$ as a main phase, the $Ti_3SiC_2$ based material having a TiC content of 0.4 mass % or less, a $TiSi_2$ content of 3 mass % or less and an open porosity of 0.5% or less.

2. The $Ti_3SiC_2$ based material according to claim 1, the $Ti_3SiC_2$ based material having Al in substitution of greater than 0 mol % up to 30 mol % of Si in the main phase $Ti_3SiC_2$.

3. The $Ti_3SiC_2$ based material according to claim 1, the $Ti_3SiC_2$ based material having a $Ti_5Si_3$ content of 8 mass % or less.

4. The $Ti_3SiC_2$ based material according to claim 1, the $Ti_3SiC_2$ based material having a SiC content of 5 mass % or less.

5. The $Ti_3SiC_2$ based material according to claim 1, the $Ti_3SiC_2$ based material having a thermal conductivity of 25 W/mK or more.

6. The $Ti_3SiC_2$ based material according to claim 1, the $Ti_3SiC_2$ based material having a bending strength of 200 MPa or more.

7. The $Ti_3SiC_2$ based material according to claim 1, the $Ti_3SiC_2$ based material having a coefficient of thermal expansion of 7 to 9 ppm/K.

8. The $Ti_3SiC_2$ based material according to claim 1, the $Ti_3SiC_2$ based material having a volume resistivity of $1\times10^{-4}$Ω·cm or less.

9. The $Ti_3SiC_2$ based material according to claim 1, wherein an oxide film formed when allowing the $Ti_3SiC_2$ based material to stand at 1000° C. for 5 hours under atmospheric pressure has a thickness of 40 μm or less.

10. An electrode formed by using the $Ti_3SiC_2$ based material according to claim 1.

11. A spark plug formed by using the electrode according to claim 10.

* * * * *